United States Patent [19]
Huang

[11] Patent Number: 5,233,864
[45] Date of Patent: Aug. 10, 1993

[54] TIRE PRESSURE INDICATOR

[76] Inventor: Tien-Tsai Huang, No. 4, Lane 30, Wu-Chang St., Pan-Chiao City, Taiwan

[21] Appl. No.: 831,493

[22] Filed: Feb. 5, 1992

[51] Int. Cl.⁵ ............................................. B60C 23/00
[52] U.S. Cl. ................................... 73/146.8; 73/744
[58] Field of Search ............... 73/146.8, 146.3, 146.2, 73/744; 340/442, 445, 448; 116/34 R; 362/119, 116, 29

[56] References Cited

U.S. PATENT DOCUMENTS 4,884,175  11/1989  Weng ............................... 73/146.8
4,918,423  4/1990  Fukuyama et al. ............... 73/146.8

Primary Examiner—Donald O. Woodiel
Attorney, Agent, or Firm—Jacobson, Price, Holman & Stern

[57] ABSTRACT

A tire pressure indicator includes an indicator main body having a first end adapted to be connected to an inflating valve member of a tire and a second end which provides a tire pressure reading. A light device has a rotatable support rotatably mounted on an appropriate location of the indicator main body, a light emitting device provided on the rotatable support, and a switch activated control circuit similarly provided on the rotatable support so as to control the operation of the light emitting device. The light device facilitates the connection of the tire pressure indicator to the inflating valve member of a tire and the viewing of the tire pressure reading under poor lighting conditions.

5 Claims, 2 Drawing Sheets

TIRE PRESSURE INDICATOR

BACKGROUND OF THE INVENTION

1. Field of the Invention

The invention relates to a pressure indicator, more particularly to a tire pressure indicator which is provided with a light device so as to facilitate the connection of the tire pressure indicator to the inflating valve member of a tire and to facilitate the viewing of the tire pressure reading under poor lighting conditions.

2. Description of the Related Art

A conventional tire pressure indicator comprises a hollow elongated casing having a first end, which is adapted to be connected to the inflating valve member of a tire so as to open the inflating valve member, and a second end having a central hole formed therethrough. A piston member is movably provided inside the casing and has a base portion which is in tight contact with an interior wall of the casing. A pressure indicating stick or rod, which projects from the base portion of the piston member, extends out of the casing via the central hole at the second end of the latter. A biasing member is provided between the base portion of the piston member and the second end of the casing.

When the casing is attached to the inflating valve member, air pressure from the tire pushes the piston member to move toward the second end of the casing. The biasing member is compressed and the pressure indicating stick extends through the second end of the casing by a length corresponding to the pressure inside the tire.

The tire pressure is usually inspected whenever the driver feels that the tire pressure is insufficient or when a tire has been inflated and it is desired to determine if excessive or insufficient tire pressure conditions exist. The steps of attaching the tire pressure indicator to the inflating valve member and the viewing of the tire pressure reading requires adequate lighting and is thus inconvenient to execute under poor lighting conditions.

SUMMARY OF THE INVENTION

Therefore, the objective of the present invention is to provide a tire pressure indicator which incorporates a light device so as to facilitate the connection of the tire pressure indicator to the inflating valve member of a tire and to facilitate the viewing of the tire pressure reading under poor lighting conditions.

Accordingly, the preferred embodiment of a tire pressure indicator of the present invention includes an indicator main body having a first end adapted to be connected to an inflating valve member of a tire and a second end which provides a tire pressure reading. The tire pressure indicator is characterized by a light device which includes: a rotatable support rotatably mounted on an appropriate location of the indicator main body; a light emitting device provided on the rotatable support; and a switch activated control circuit means similarly provided on the rotatable support so as to control the operation of the light emitting device. The light device facilitates the connection of the tire pressure indicator to the inflating valve member and the viewing of the tire pressure reading under poor lighting conditions.

BRIEF DESCRIPTION OF THE DRAWINGS

Other features and advantages of the present invention will become apparent in the following detailed description of the preferred embodiment, with reference to the accompanying drawings, of which.

DETAILED DESCRIPTION OF THE PREFERRED EMBODIMENT

Figure 1:
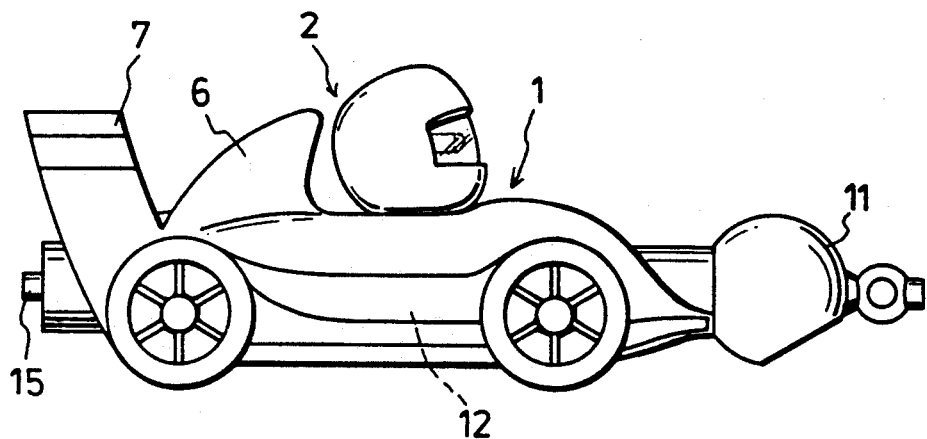
FIG. 1 is a schematic side view of the preferred embodiment of a tire pressure indicator according to the present invention.
Figure 2:
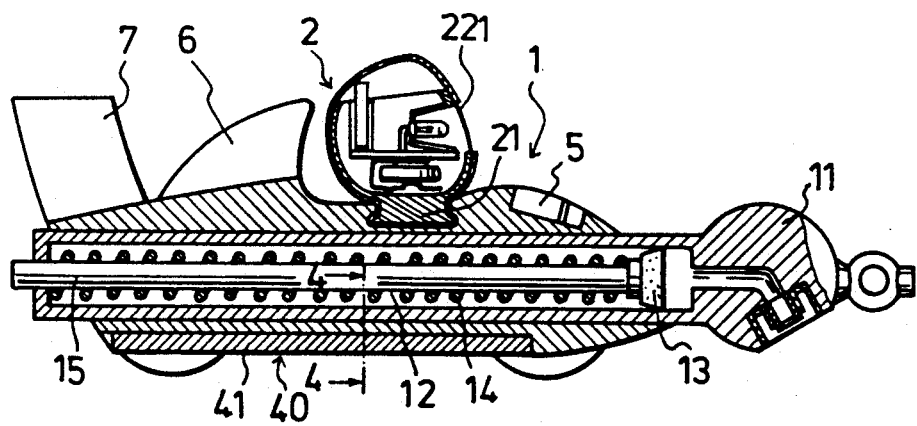
FIG. 2 is a sectional view of the preferred embodiment as shown in FIG. 1.

Referring to FIGS. 1 and 2, the preferred embodiment of a tire pressure indicator according to the present invention is shown to comprise an indicator main body 1 including a hollow casing 11 which confines an elongated space 12, a piston base 13, a biasing member 14 and a pressure indicating stick 15. The casing 11 has a first end which is adapted to be connected to the inflating valve member of a tire not shown. The piston base 13 is movably provided inside the casing 11 and is in tight contact with an interior wall of the casing 11. The pressure indicating stick 15, which projects from the piston base 13, extends out of the second end of the casing 11. The biasing member 14 is provided between the piston base 13 and the second end of the casing 11. The casing 11 has a top side provided with a circular retaining groove 16.

Figure 3:
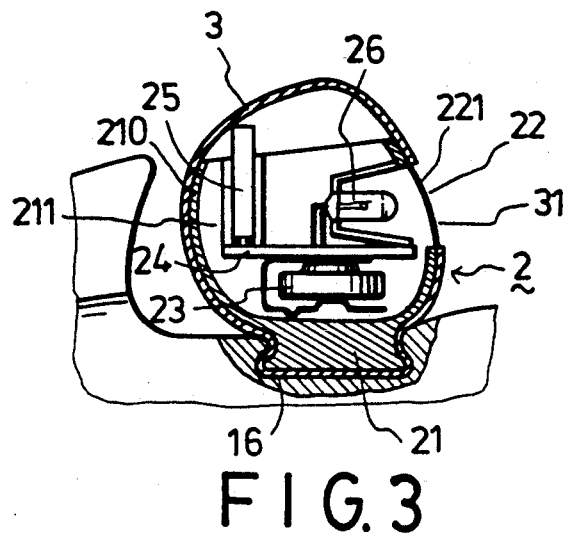
FIG. 3 is an enlarged view of a light device of the tire pressure indicator of the present invention.

Referring to FIG. 3, the preferred embodiment further comprises a light device which includes a rotatable support 2. The rotatable support 2 has a plug portion 21 which is received in the retaining groove 16. The plug portion 21 is in frictional contact with the surface defining the retaining groove 16. The plug portion 21 ca therefore be rotated and positioned at a desired angle in the retaining groove 16. The rotatable support 2 has a peripheral wall portion 210 which curves upwardly from the plug portion 21 and which confines a receiving space 211. The wall portion 210 is formed with a horizontal window opening 22. A transparent pane 221 is provided on the window opening 22. The following components are connected in a known circuit arrangement and are provided on the rotatable support 2 inside the receiving space 211: a light emitting device 26 such as a pair of light emitting diodes only one is shown and a switch activated control circuit which includes a mercury button cell 23, a circuit board 24 and a pressure operated switch 25. The switch 25 is operated so as to control the lighting action of the light emitting device 26. The light emitting device 26 is disposed adjacent to the window opening 22. This permits light coming from the light emitting device 26 to pass through the transparent pane 221. The indicator main body 1 and the rotatable support 2 are made of a rigid, insulating material.

The rotatable support 2 and the receiving space 211 are enclosed by a flexible wrapping 3 made of rubber or PVC. The flexible wrapping 3 is formed with a window opening 31 that is aligned with the transparent pane 221.

Note that the indicator main body 1 is shaped as a race car, while the rotatable support 2 and the flexible wrapping 3 cooperatively form the helmet of a race car driver. The light output of the light emitting device 26 passes through what seems to be a visor of the helmet.

Figure 4:
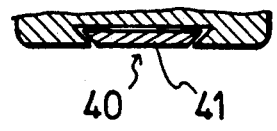
FIG. 4 is a 4—4 section of FIG. 2.

Referring to FIGS. 2 and 4, the bottom side of the casing 11 is formed with an elongated dovetail groove 40. A tire tread measuring strip 41 is slidably retained in the dovetail groove 40 and is used to measure the depth of a tire tread. The front end of the casing 11 is provided with a known liquid crystal display-type presettable alarm clock 5.

The top side of the casing 11 is further formed with a back portion 6 and a tail fin portion 7. The height of the intermediate sections of the back portion 6 and the tail fin portion 7 are lower than the sides of the back portion 6 and the tail fin portion 7. Thus, when the rotatable support 2 is rotated, the back portion 6 and the tail fin portion 7 do not obstruct the light output of the light emitting device 26.

When measuring the tire pressure under poor lighting conditions, the switch 25 is first operated so as to activate the light emitting device 26. The light output of the light emitting device 26 facilitates the attachment of the casing 11 to the inflating valve member of the tire not shown. Air from the tire enters the elongated space 12 and pushes the piston base 13 to encompass the biasing member 14 and permit the pressure indicating stick 15 to extend out of the casing 11 by a length corresponding to the pressure inside the tire. This illustrates how the preferred embodiment provides a tire pressure reading. The rotatable support 2 is then rotated so that the light output of the light emitting device 26 can help facilitate the viewing of the tire pressure reading.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A tire pressure indicator including an indicator main body having
    a hollow casing with one end adapted to be connected to an inflating valve member of a tire;
    a piston base movably provided inside said casing and being in tight contact with an interior wall of said casing;
    a pressure indicating rod projecting from said piston base and extending from an opposite end of said casing so as to provide a tire pressure reading; and
    a biasing member provided between said piston base and the other end of said casing, said tire pressure indicator being characterized by a rotatable support rotatably mounted on said indicator main body; a light emitting device provided on said rotatable support; and a switch activated control circuit means similarly provided on said rotatable support so as to control operation of said light emitting device, said rotatable support being rotatable between a first position wherein the light emitting device can illuminate said one end of the hollow casing to facilitate connection to the inflating valve member of the tire and a second position wherein the light emitting device can illuminate the opposite end of the casing to facilitate reading of the tire pressure.

2. The tire pressure indicator as claimed in claim 1, wherein said casing has a top side provided with a circular retaining groove, said rotatable support having a plug portion which is rotatably retained in said retaining groove.

3. The tire pressure indicator as claimed in claim 2, wherein said rotatable support has a peripheral wall portion which curves upwardly from said plug portion and which confines a receiving space to receive said light emitting device and said control circuit means, said light emitting device being disposed adjacent to a horizontal first window opening formed on said wall portion, said light device further comprising a flexible wrapping which encloses said rotatable support and said receiving space, said flexible wrapping being formed with a second window opening aligned with said first window opening of said wall portion.

4. The tire pressure indicator as claimed in claim 3, wherein said light device further comprises a transparent pane provided on said first window opening.

5. The tire pressure indicator as claimed in claim 2, wherein said casing has a bottom side formed with an elongated dovetail groove, said tire pressure indicator further comprising a tire tread measuring strip slidably retained in said dovetail groove.

* * * * *